United States Patent [19]

Falck et al.

[11] 4,207,505
[45] Jun. 10, 1980

[54] MEASURING SYSTEM

[75] Inventors: Peter L. Falck, Rockford, Ill.; Edmund M. Hamlin, Jr., Lancaster, Calif.

[73] Assignee: Sundstrand Corporation, Rockford, Ill.

[21] Appl. No.: 794,984

[22] Filed: May 9, 1977

[51] Int. Cl.² ............................................. G05B 11/18
[52] U.S. Cl. .................................... 318/595; 318/630; 318/661; 340/347 SY
[58] Field of Search ............... 318/592, 595, 661, 630; 340/347 SY

[56] References Cited

U.S. PATENT DOCUMENTS

| | | | |
|---|---|---|---|
| 2,950,427 | 8/1960 | Tripp | 318/661 |
| 3,166,698 | 1/1965 | Moser et al. | 318/595 |
| 3,551,656 | 12/1970 | Wohlfeil | 318/592 |
| 3,668,377 | 6/1972 | Inaba et al. | 318/661 |
| 3,710,223 | 1/1973 | Cottrell | 318/661 |
| 3,976,869 | 8/1976 | Stella et al. | 340/347 SY |
| 4,014,014 | 3/1977 | Jones et al. | 340/347 SY |
| 4,062,005 | 12/1977 | Freed et al. | 340/347 SY |

OTHER PUBLICATIONS

Gambrel, "Angular Position Determining Means," *IBM Technical Disclosure Bulletin*, 2/76, pp. 2756-2757.

Brouillette, "A Shaft Multiplication Precision Angle Encoder," *Electrical Engineering*, 3/62, pp. 119-121.

*Primary Examiner*—J. V. Truhe
*Assistant Examiner*—Eugene S. Indyk
*Attorney, Agent, or Firm*—Wegner, Stellman, McCord, Wiles & Wood

[57] ABSTRACT

A system for measuring the displacement of a workpiece from a reference coordinate system. Position information with respect to the various axes of the coordinate system is acquired by rotary resolver assemblies that measure the angular position of rotatable elements. Each resolver assembly includes a coarse and a fine resolver. Signals representative of the SIN and COS of the angles of the coarse and fine resolvers for each rotor assembly (or referred to as a channel) are applied to a multiplexer. The multiplexer sequentially selects the appropriate channel and the signals are then converted into angular information for each channel. An accurate count of the number of revolutions of the rotatable elements is then obtained. Offset error correction may be provided for each channel. The number of counted revolutions, corrected for offset error, may be multiplied by a scaler for conversion into a linear displacement. The output of the system may be provided to a display indicating the location of the workpiece with respect to the coordinate system or, alternatively, the signals representing linear displacement may be utilized in other peripheral equipment.

1 Claim, 4 Drawing Figures

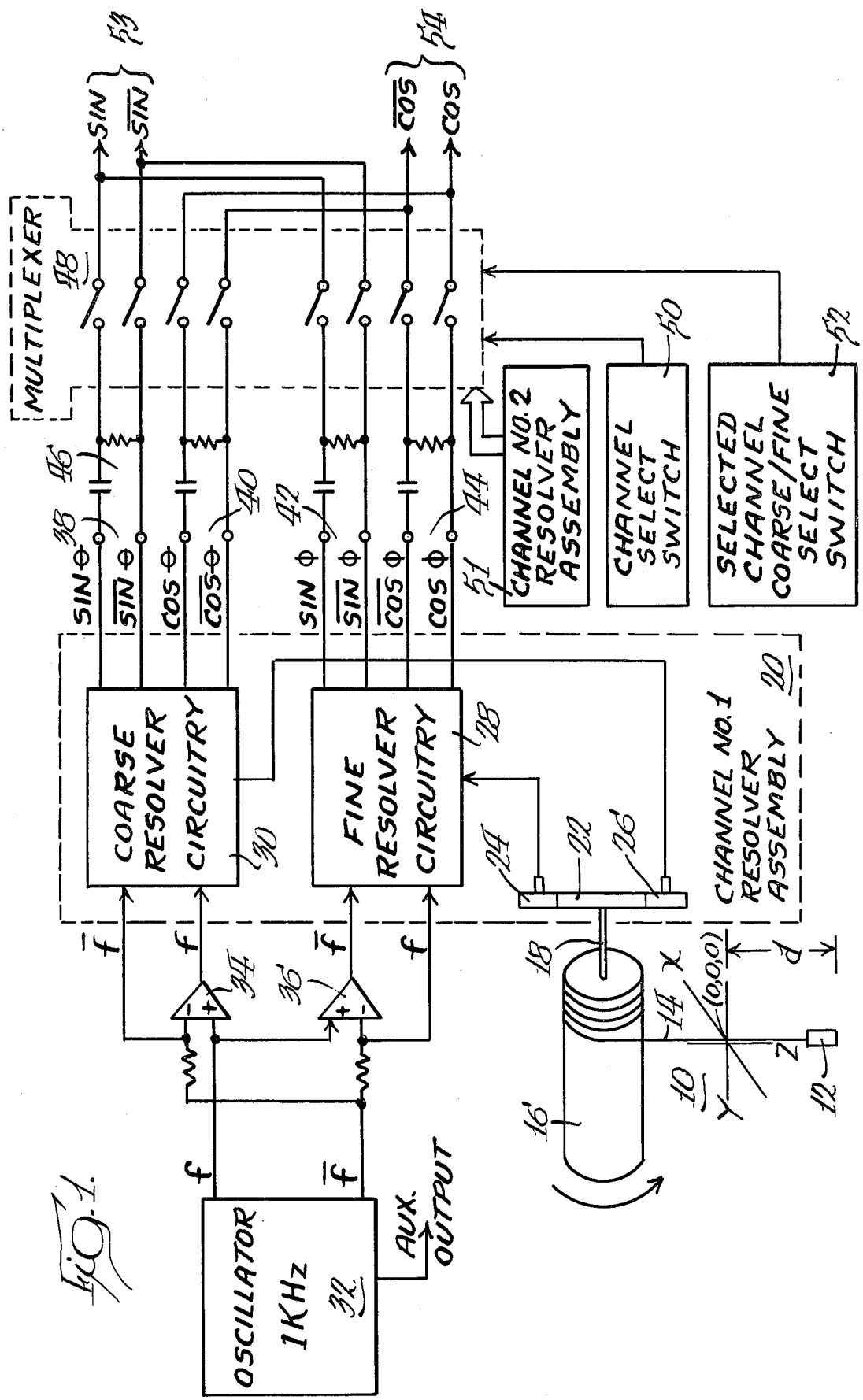

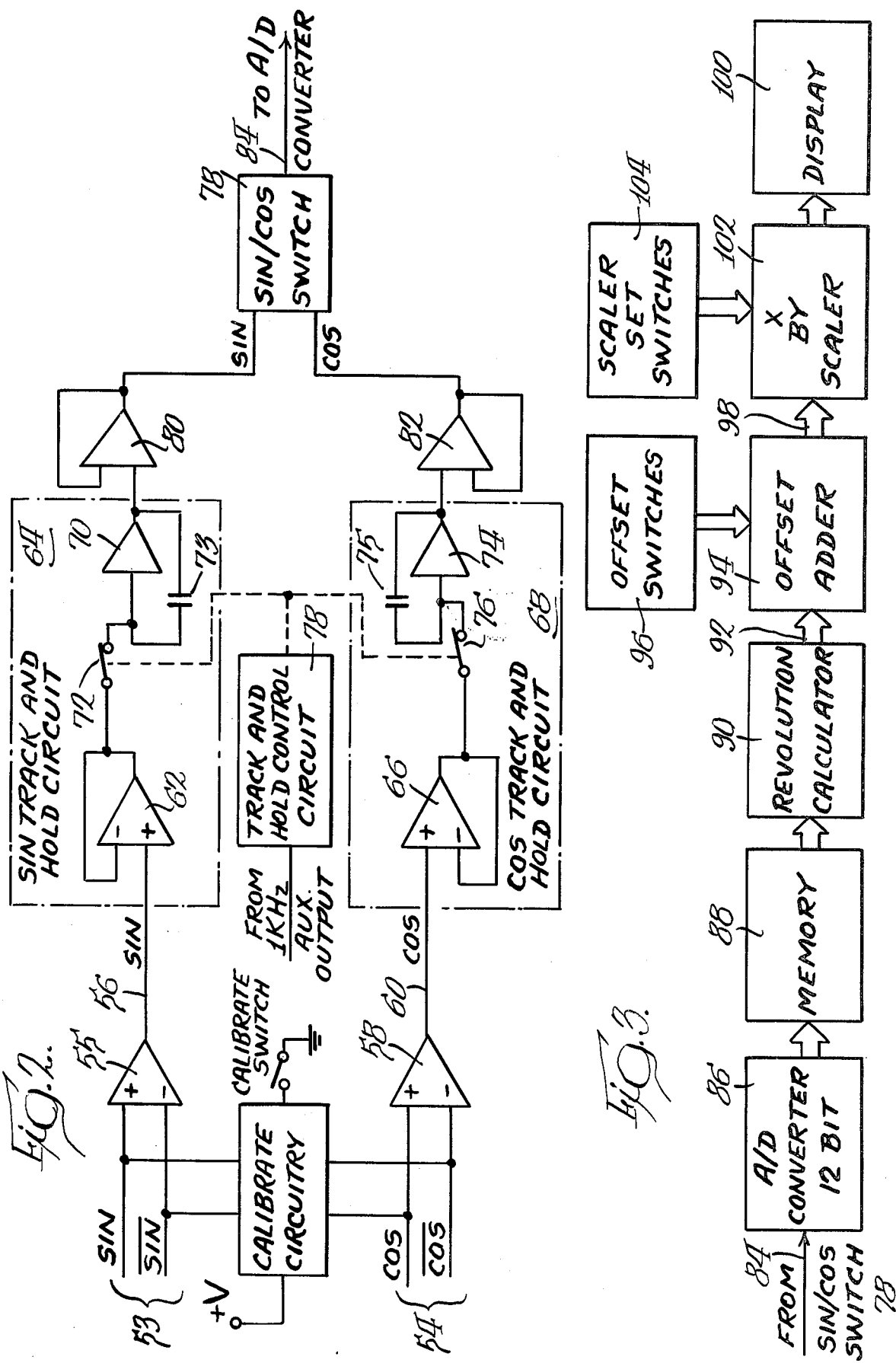

MEASURING SYSTEM

BACKGROUND OF THE INVENTION

This invention relates to measuring devices and, more particularly, to a system for determining and transmitting the position of a movable element with respect to a reference.

There are many applications for systems which accurately measure the position of an element or workpiece from a reference point. In the case of three-dimensional space, the location of the point is determined by its X, Y and Z positions. To acquire the location of the point in the three-dimensional space, each of the X, Y and Z axes may be provided with devices for determining the X, Y and Z distances of the point from the zero reference point. Often rotary resolvers are coupled to a screw and slide assembly where the number of rotations of the screw determine the linear position of the slide from the reference point. Similarly, a rotary resolver may be coupled to a rotatable shaft on which is mounted a drum. As a flexible member is removed from the drum, the drum rotates and the length of the flexible member removed from it is proportional to the angular position of the shaft. There are a number of systems which measure the particular location of a point with respect to a reference coordinate system, many of which employ resolvers. However, many of these systems are not capable of providing accurate measurement of the displacement from a fixed reference. They do not provide for translating the absolute angular position of a shaft into units of distance. Some are expensive and if more than one axis is to be measured, there is a significant duplication of parts.

We have invented a system which can accurately measure the distance of a point from a reference wherein the point is acquired by determining the angular positon of a shaft and accurately converting the angular position into linear information. The system is capable of measuring many position axes and can process position information of a plurality of channels, each channel representing a position or distance along an axis. Duplication of various components within the system is minimized by employing multiplexing techniques.

SUMMARY

Position information with respect to the various axes of the coordinate system is acquired by rotary resolver assemblies that measure the angular position of rotatable elements. The angular position of each rotatable element is representative of the linear position of the workpiece from the respective axis of the coordinate system. Each resolver assembly includes a coarse and a fine resolver wherein the coarse resolver shaft turns no more than 360° for maximum displacement of the workpiece from the respective axis. The fine resolver shaft repeatedly varies from 0° to 360° a fixed number of times with respect to the rotation of the coarse resolver. Signals representative of the SIN and COS of the angles of the coarse and fine resolvers for each rotor assembly (sometimes referred to as a channel) are applied to a multiplexer. The multiplexer sequentially selects the appropriate channel and provides signals representative of SIN and COS information of the coarse and then the fine resolvers of the selected channel and the signals are then converted into angular information for each channel. An accurate count of the number of revolutions of the rotatable elements is then obtained from the angular information. The number of counted revolutions for each rotatable element is provided to an offset adder to correct for any offset error with respect to the coordinate system. Offset error correction may be provided for each channel. The number of counted revolutions, corrected for offset error, may be multiplied by a scalar for conversion into a linear displacement. Scalar set switches establish the value of the multiplier for each channel. The output of the system may be provided to a display indicating the location of the workpiece with respect to the coordinate system or, alternatively, the signals representing linear displacement may be utilized in other peripheral equipment.

It is a feature of the present invention to accurately measure the number of revolutions of a rotatable element by the use of a rotary resolver assembly having a coarse and a fine resolver.

Another feature of the present invention is to provide a measurement of linear displacement of a workpiece from the number of revolutions counted.

It is another feature of the present invention to accurately measure the number of revolutions of several rotatable elements, the position of each element being indicative of a linear displacement of a workpiece with respect to an axis of a coordinate system.

Another feature of the present invention is to count accurately the number of revolutions of the rotatable elements even though there may be backlash created within the resolver assembly or a small amount of play between the gears within the resolver assembly.

Yet another feature of the present invention is to provide a measurement system which can easily correct for any offset error between an axis and the resolver reference or a zero point.

A further feature of the invention is to provide a measurement system which converts the number of counted revolutions of each of the rotatable elements (each corrected for an offset error) by a scalar as selected by the operator to provide a measurement of linear displacement.

Another feature of the invention is to provide a system which calculates the number of rotations of the rotatable elements from the signals provided by the coarse and fine resolvers even though the signals may have an undesirable noise component.

Other features will become apparent when considering the drawing in which:

DRAWING

FIG. 1 is a diagram of channel #1 resolver assembly of a multi-channeled system which provides signals representative of the SIN and COS of the coarse and fine resolvers of each channel;

FIG. 2 is a block diagram of the circuit that acquires the signal representative of the SIN or COS received from the circuitry of FIG. 1;

FIG. 3 is a block diagram of the circuitry for calculating revolutions and converting the revolutions into a linear measurement.

DESCRIPTION OF PREFERRED EMBODIMENT

Figure 4:
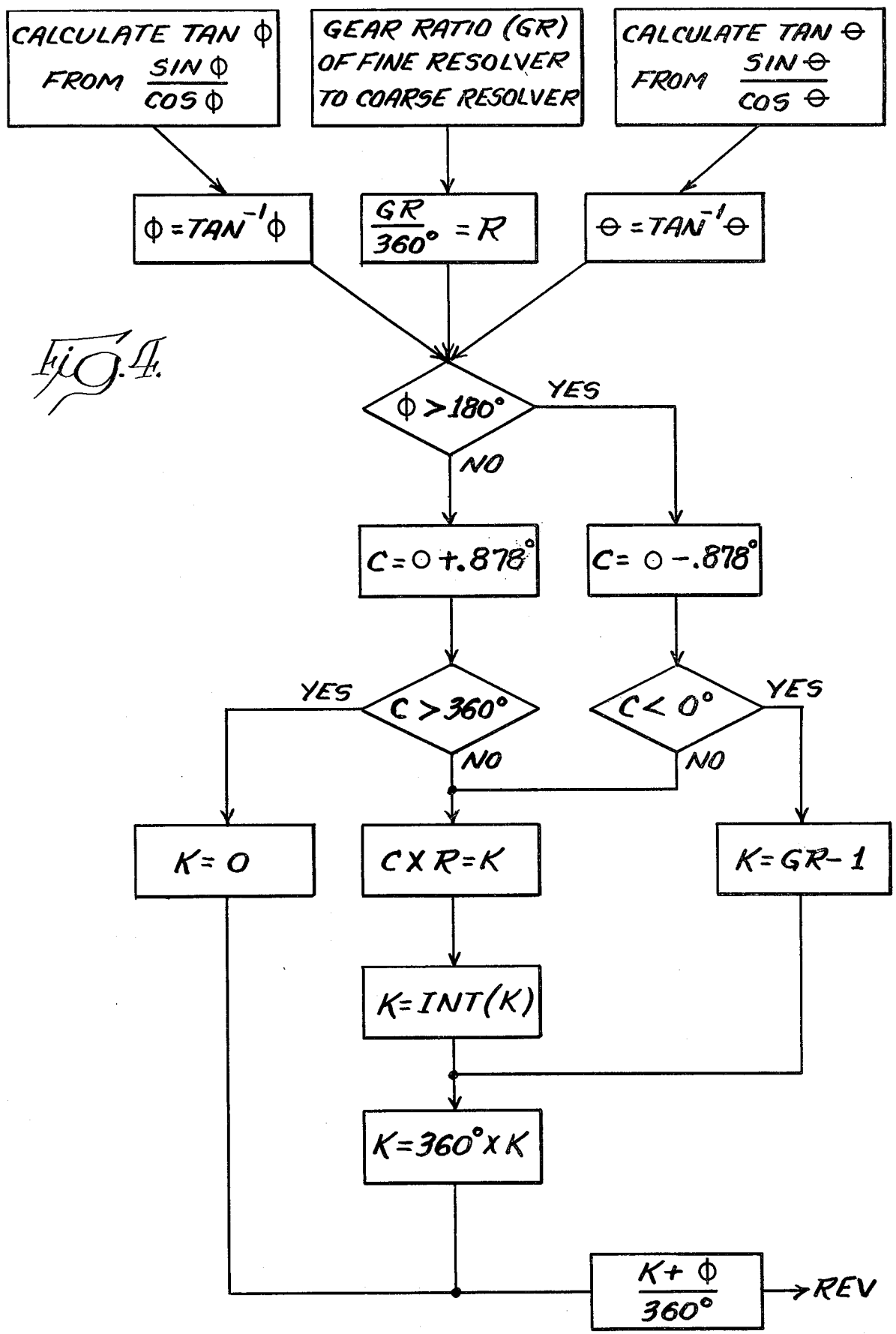
FIG. 4 is a flow diagram of the operation of the revolution calculator shown in FIG. 3.

Referring to FIG. 1, it is desirable to measure the distance d between the reference (0,0,0) point of the coordinate system 10 and the position of workpiece 12.

Workpiece 12 is suspended at the end of flexible member 14 which unwinds from drum 16 as shaft 18 rotates in a counterclockwise manner, as shown. The distance 2, as well as the distance of the workpiece 12 with respect to the X and Y axes, is to be measured and provided to either a single display or a plurality of displays or to a utilization mechanism e.g., a recorder or computer. The display may indicate the X, Y or Z position of the workpiece 12 with respect to the reference point (0,0,0) of the coordinate system 10. For the purpose of explanation, the operation of the system will be explained with reference to the vertical position of the workpiece 12 with respect to point (0,0,0) of coordinate system 10 (sometimes designated channel #1), it being understood that position information along the other axes X and Y may be acquired from X and Y positioning means and displayed in a similar manner.

Shaft 18 is coupled for rotation with resolver assembly 20. The assembly may have main gear 22 which is directly coupled to shaft 18, in which case gears 24 and 26 are rotated by gear 22 and have an established gear ratio between them. Gear 24 drives fine resolver circuitry 28 and gear 26 drives coarse resolver circuitry 30. Gears 22, 24 and 26 are selected such that gear 26 makes no more than one revolution for the total or maximum displacement which flexible member 14 is to extend. Gear 24 rotates a fixed number of times with respect to gear 26 as, for example, 100 to 1 or 200 to 1. Thus, if the gear ratio between gears 24 and 26 is 100 to 1, gear 24 will have rotated 100 times for a single revolution of gear 26. Fine resolver 28 and coarse resolver 30 provide angular information of gears 24 and 26, respectively, by generating signals proportional to the SIN and the COS of the respective angular position of their resolver shaft.

Oscillator 32 provides signals f and $\overline{f}$ (f not) to drivers 34 and 36. Drivers 34 and 36 provide a driving signal (or a source of current) to fine resolver circuitry 28 and coarse resolver circuitry 30. The fine and coarse resolver assembly is available from Computer Conversions Corp. of East Northport, New York, as part MR-90.

The angle $\theta$ of the coarse resolver varies between 0° and 360° since gear 26 turns no more than one complete revolution for the maximum displacement of the workpiece. The output of coarse resolver 30 provides a signal SIN$\theta$, COS$\theta$, $\overline{SIN\theta}$ and $\overline{COS\theta}$ SIN$\theta$ and $\overline{SIN\theta}$ are provided on output leads 38 and COS$\theta$ and $\overline{COS\theta}$ are provided on output leads 40.

Similarly, the angle of fine resolver 28 repeatedly varies between 0° and 360° since gear 24 turns many times with respect to the single revolution made by gear 26. Fine resolver circuitry 28 provides a SIN$\phi$ and $\overline{SIN\phi}$ on output leads 42 and COS$\phi$ and $\overline{COS\phi}$ on output leads 44. The signals on output leads 38, 40, 42 and 44 represent the angular position of gears 24 and 26, thus providing information as to the angular position of shaft 18.

The output leads 38, 40, 42 and 44 are connected through impedance matching networks, as network 46, to multiplexer circuit 48. Multiplexer circuit 48 is controlled by a channel select switch 50 and a coarse/fine select switch 52.

Channel select switch 50 determines which of the multichannels is to be measured as between channel #1 and channel #2. Coarse/fine select switch 52 determines whether the fine or the coarse resolver within a selected channel is to be measured. The multiplexer circuit 48 operates successively to sample each of the channels in the system moving from the first channel to the second channel and on to the Nth channel and returning to the first channel again. For each channel, as channel #1 shown in FIG. 1, the switches within the multiplexer circuit 48 provide information from the coarse resolver (SIN$\theta$, $\overline{SIN\theta}$, COS$\theta$ and $\overline{COS\theta}$) and then to provide information from the fine resolver (SIN$\phi$, $\overline{SIN\phi}$, COS$\phi$, and $\overline{COS\phi}$). Thus, SIN resolver information, representing both $\phi$ and $\theta$, is available on output line 53, whereas COS information, representing both $\phi$ and $\theta$, are available on output 54. For the purpose of notation, SIN means SIN$\phi$ or SIN$\theta$, and COS means COS$\phi$ or COS$\theta$.

The output leads 53 and 54 from multiplexer circuit 48, as controlled by channel select switch 50 and coarse/fine select switch 52, provide SIN and COS information from the first channel, coarse and then fine. Then multiplexer circuit 48 provides SIN and COS information from channel #2, coarse and fine. All channels are sequentially sampled in a similar manner. Therefore, output leads 53 and 54 provide SIN and COS information for all channels as well as coarse and fine resolver information within each channel in an established sequence.

Referring to FIG. 2, outputs 53 and 54 are provided to differential amplifiers. Specifically, referring to output lead 53, SIN and $\overline{SIN}$ information are provided to differential amplifier 55. By connecting the SIN to the positive input terminal and the $\overline{SIN}$ to the negative input terminal, common mode noise introduced between the multiplexer circuit 48 and the differential amplifier 55 cancels to provide a clean SIN signal on output 56 of differential amplifier 55. Similarly, referring to output 54, a COS signal applied to the positive input terminal of differential amplifier 58 and the $\overline{COS}$ applied to the negative input terminal of differential amplifier 58 provides a clean COS on output lead 60 of differential amplifier 58, a common mode noise-cancelling effect being provided by differential amplifier 58.

Output 56 of differential amplifier 55 is provided to the positive input terminal of the track and hold amplifier 62 of the SIN track and hold circuit 64. Similarly, output 60 of differential amplifier 58 is applied to the positive input terminal to track and hold amplifier 66 of the COS track and hold circuit 68.

The SIN track and hold circuit will now be described. The negative input terminal to the track and hold amplifier 62 is connected to the output thereof. The voltage at the output of differential amplifier 62 is applied to the input terminal of amplifier 70 through switch 72. The input terminal of amplifier 70 is also coupled through capacitor 73 to its output terminal. Thus, the signals at the output of SIN track and hold amplifier 64 follows the positive input signal on line 56. Switch 72 is normally closed and the voltage across capacitor 73 varies with the signal on line 56. Similarly, in COS track and hold circuit 68 the output of the COS track and hold amplifier 66 is provided to the input of amplifier 74 through switch 76 which is normally closed. The input terminal of amplifier 74 is also coupled through capacitor 75 to its output. Thus, the signal at the output of track and hold amplifier 68 follows the positive input signal on line 60. When SIN and COS measurements are to be taken, as will be explained in greater detail below, the track and hold control circuit 78 opens switches 72 and 76, disconnecting the amplifiers from similar capacitors 73 and 75. Capacitors 73 and 75 remain charged with the voltage representing the SIN and the COS.

Track and hold control circuitry 78 controls switches 72 and 76, which may be opened at a convenient time for each measurement. It is desirable to acquire a SIN and a COS measurement when the amplitude of the signal f or f at oscillator 32 (FIG. 1) is at a maximum. Opening the switches when oscillator 32 provides a maximum voltage increases the signal-to-noise ratio and improves the accuracy of the measurement since the voltage across capacitors 73 and 75 is higher. An output of the oscillator 32 may be provided to the track and hold control circuitry 78 for timing.

The voltage across capacitor 73 is provided to SIN/COS switch 78 through buffer amplifier 80. Similarly, the voltage across capacitor 74 is provided to SIN/COS switch 78 through buffer amplifier 82. Buffer amplifiers 80 and 82 sufficiently isolate the track and hold circuits 64 and 68 from the SIN and COS switch 78, which provides for a more accurate measurement.

SIN and COS switch 78 provides an analog signal output on line 84 representing either the SIN or the COS from buffer amplifier 80 or buffer amplifier 82, respectively. Thus, the signal on output lead 84, as controlled by the multiplexer circuit 48 (FIG. 1) and the SIN/COS switch 78, is the SIN of the coarse angle $\theta$ of the first channel, the COS of the coarse angle $\theta$, the SIN of the fine angle $\phi$ of the first channel and the COS of the first angle $\phi$ of the first channel.

Referring to FIG. 3, the output 84 is coupled to the A/D converter 86. The A/D converter 86 successively converts SIN and COS information of the coarse and fine resolvers for each of the channels into representative 12-bit words. The 12-bit words are provided to memory 88 which stores the SIN and COS information from the coarse and fine resolvers ($\phi$ and $\theta$) for each channel. The A/D conversion of the analog signal on line 84 takes place immediately after switches 72 and 76 open. The angular information from the fine and coarse resolvers of each channel, as stored by memory 88, are employed by revolution calculator 90 to calculate the number of revolutions of shaft 18. The output of revolution calculator 90 is available on output line 92 and is a binary number which precisely represents the number of revolutions of shaft 18 in the case of channel #1 and other shafts (not shown) from other channels.

The signal representing the number of revolutions is provided to offset adder 94. Offset adder 94, as controlled and set by offset switches 96, adds (or subtracts) a digital signal to the signal on line 92 to correct for any offset error between the axis and the resolver reference or zero point. Specifically, the offset switches 96 are initially set to provide a zero display on display 100 when workpiece 12 is at the reference point (0,0,0) of the coordinate system 10, for example. Different numbers may be added for the different channels, all of which are set by switches 96. Offset switches 96 may be dual in-line package switches (DIP) in the form of a matrix to provide a field programmable offset switchboard to accommodate offset at installation.

The output 98 of the offset adder 94 is a binary signal which represents the number of revolutions of shaft 18 as corrected by the initial offset, as explained above. It is often desirable to express shaft rotation in another form. For example, the number of revolutions of shaft 18 represents a specific linear displacement of workpiece 12 with respect to (0,0,0) of coordinate system 10. Multiplier 102, as set by scalar set switches 104, multiplies the signal on output line 98 by a scalar as determined by scalar set switch 104. Different scalars may be employed for different axes. The output of the multiplier 102 is provided to display 100 to indicate the linear distance in travel from the coordinate.

Referring to FIG. 4, the revolution calculator 90 will now be explained. The revolution calculator 90, coupled to memory 88, provides a digital word representative of the number of revolutions made by shaft 18 when channel #1 is being measured. When other channels are being measured, the revolution calculator 90 provides a calculation of the number of revolutions for the particular channel. In all cases, however, revolution calculator 90 provides a precise count of the number of revolutions of a shaft, as shaft 18, from the SIN and COS information of the coarse and fine resolvers.

The revolution calculator 90 may be a hard-wired digital computer or may be implemented by software. In either case, the memory must be sufficient to retain the values of the coarse and the fine resolvers for all channels, provide an arc tangent function and perform housekeeping functions.

The units shown in the flow diagram of FIG. 4 are expressed in degrees unless otherwise stated, it being understood that either corresponding computer units or radians could also be used in the calculation.

The tangent of $\phi$ is acquired by the division of the SIN$\phi$ by the COS$\phi$. The arc tangent of $\phi$ is taken to provide $\phi$. Similarly, the tangent of $\theta$ is acquired from the division of the SIN$\phi$ by the COS$\phi$. The arc tangent of $\theta$ is taken to provide $\theta$. Further detail of systems for performing these calculations may be found in Jones U.S. Pat. No. 4,014,014 and Stella U.S. Pat. No. 3,976,869. Also, the gear ratio of the fine resolver to the coarse resolver is entered into the system and divided by 360° to provide the constant R. These three inputs, $\phi$, $\theta$ and R, provide the necessary information to accurately calculate the number of revolutions of shaft 18.

The first step in the calculation is to determine whether the angle of the fine resolver is greater or less than 180°. Depending upon the position of the fine resolver, a constant, as 0.878°, is either added to or subtracted from the angle of the coarse resolver, $\theta$. The reason for the addition or subtraction of a constant to the coarse resolver angle is to remove any ambiguity created by backlash or resolver misalignment of the coarse resolver around the 0°/360° position of the fine resolver.

If the angle of the coarse resolver plus or minus the constant is less than 360° but greater than 0°, it, C, is multiplied by R to provide a value K. K is then truncated to provide an integer. In other words, the fraction portion of K is removed. The truncated portion of K is then multiplied by 360° and then added to the angle of the fine resolver $\phi$. K plus $\phi$ is then divided by 360° to provide the number of revolutions of shaft 18.

If C is less than 0°, K is established by subtracting 1 from the gear ratio, in which case K is then multiplied by 360° and added to $\phi$, all of which is divided by 360° to provide the number of revolutions.

If C is greater than 360°, K is set to 0 and the number of revolutions simply corresponds to $\phi$ divided by 360°.

We claim:

1. In the measurement of the displacement of a machine element from a reference position, from the SIN and COS outputs of coarse and fine rotary resolvers each having a shaft connected with said machine element, and subject to ambiguities from misalignment of the resolvers at the 0°/360° position of the fine resolver, the method for determining the angular position of the coarse resolver which comprises:

determining whether the position of the fine resolver is between 0° and 180° or between 180° and 360°;

combining a constant with the angle of the coarse resolver, the constant having a sign dependent on the position of the fine resolver, to establish a corrected coarse resolver position;

calculating the integral number of revolutions of the fine resolver with respect to the reference position, from the corrected coarse resolver position;

adding to the integral number of fine resolver revolutions the fine resolver position; and calculating from said last mentioned sum the displacement of the machine element from the reference position.

* * * * *